US008821747B2

(12) United States Patent  
Mizuno et al.

(10) Patent No.: US 8,821,747 B2  
(45) Date of Patent: Sep. 2, 2014

(54) METHOD OF MANUFACTURING A GLASS SUBSTRATE FOR A MAGNETIC DISK

(75) Inventors: Takanori Mizuno, Tokyo (JP); Yosuke Suzuki, Tokyo (JP)

(73) Assignee: Hoya Corporation, Tokyo (JP)

( * ) Notice: Subject to any disclaimer, the term of this patent is extended or adjusted under 35 U.S.C. 154(b) by 149 days.

(21) Appl. No.: 13/122,673

(22) PCT Filed: Oct. 5, 2009

(86) PCT No.: PCT/JP2009/067331
§ 371 (c)(1),
(2), (4) Date: May 10, 2011

(87) PCT Pub. No.: WO2010/041623
PCT Pub. Date: Apr. 15, 2010

(65) Prior Publication Data
US 2011/0204028 A1  Aug. 25, 2011

(30) Foreign Application Priority Data

Oct. 7, 2008 (JP) .................................. 2008-260593
Feb. 6, 2009 (JP) .................................. 2009-025586

(51) Int. Cl.
*C25F 3/00* (2006.01)
*C03C 25/68* (2006.01)
*C09K 13/08* (2006.01)

(52) U.S. Cl.
USPC ........ 216/98; 216/2; 216/22; 216/38; 216/52; 216/88; 216/90; 216/91; 216/96; 216/97; 216/104; 252/79.1; 252/79.2; 252/79.3; 252/79.4; 252/79.5; 65/30.1; 451/41

(58) Field of Classification Search
CPC  C03C 19/00; C03C 23/0075; C03C 2204/08; C03C 10/0027; C03C 10/0036; G11B 5/7315; G11B 5/82; G11B 5/84; G11B 5/8404; G11B 7/2531; B24B 37/10; B24B 37/245; B24B 37/24; B24B 7/242
USPC ......... 252/79.1, 79.2, 79.3, 79.4, 79.5; 216/2, 216/22, 38, 52, 83, 88, 89, 90, 91, 96, 97, 216/98, 99, 100, 103, 104; 451/41; 65/30.1
See application file for complete search history.

(56) References Cited

U.S. PATENT DOCUMENTS 4,833,001 A * 5/1989 Kijima et al. ................ 428/141
5,871,654 A * 2/1999 Mannami et al. ............... 216/22

(Continued)

FOREIGN PATENT DOCUMENTS

| CN | 1947177 A | 4/2007 |
| CN | 101147193 | 3/2008 |

(Continued)

OTHER PUBLICATIONS

International Search Report dated Nov. 10, 2009 for PCT/JP2009/067331.

(Continued)

*Primary Examiner* — Nadine Norton
*Assistant Examiner* — Christopher Remavege
(74) *Attorney, Agent, or Firm* — Amster, Rothstein & Ebenstein, LLP

(57) ABSTRACT

A method for manufacturing a glass substrate for a magnetic disk comprises a surface grinding step of processing a mirror-surface plate glass, having a main surface in the form of a mirror surface, to a required flatness and surface roughness using fixed abrasive particles. The method comprises, before the surface grinding step using the fixed abrasive particles, a surface roughening step of roughening the surface of the mirror-surface plate glass by frosting.

34 Claims, 3 Drawing Sheets

(56) References Cited

U.S. PATENT DOCUMENTS

| | | | |
|---|---|---|---|
| 6,553,788 B1 * | 4/2003 | Ikeda et al. | 65/31 |
| 6,568,995 B1 * | 5/2003 | Mitani et al. | 451/36 |
| 7,010,939 B2 * | 3/2006 | Yoshikawa et al. | 65/30.14 |
| 7,070,703 B2 * | 7/2006 | Benning et al. | 216/89 |
| 7,250,114 B2 * | 7/2007 | Kiehlbauch et al. | 216/31 |
| 7,691,279 B2 * | 4/2010 | Koike | 216/84 |
| 8,127,433 B2 * | 3/2012 | Marumo | 29/603.1 |
| 8,603,350 B2 * | 12/2013 | Goto et al. | 216/52 |
| 2002/0061603 A1 * | 5/2002 | Eto | 438/3 |
| 2003/0109202 A1 * | 6/2003 | Matsuno et al. | 451/41 |
| 2003/0171075 A1 | 9/2003 | Nihonmatsu et al. | |
| 2004/0096705 A1 * | 5/2004 | Homola | 428/694 SG |
| 2005/0208883 A1 * | 9/2005 | Yoshida et al. | 451/41 |
| 2005/0227590 A1 | 10/2005 | Sung | |
| 2006/0062129 A1 * | 3/2006 | Saito et al. | 369/272.1 |
| 2008/0020238 A1 | 1/2008 | Tanaka et al. | |
| 2008/0213626 A1 * | 9/2008 | Kobayashi et al. | 428/800 |
| 2009/0113935 A1 * | 5/2009 | Suzuki et al. | 65/64 |
| 2012/0100786 A1 * | 4/2012 | Haneda | 451/41 |

FOREIGN PATENT DOCUMENTS

| | | |
|---|---|---|
| JP | 11-203674 | 7/1999 |
| JP | 2002-055061 | 2/2002 |
| JP | 2005-144452 | 6/2005 |
| WO | 2008/062657 | 5/2008 |

OTHER PUBLICATIONS

Singapore Search Report and Written Opinion dated Apr. 25, 2012.
Chinese Office Action, dated Jun. 19, 2014 for Chinese Patent Application No. 201210196739.5, along with English translation.

* cited by examiner

US 8,821,747 B2

METHOD OF MANUFACTURING A GLASS SUBSTRATE FOR A MAGNETIC DISK

CROSS-REFERENCE TO RELATED APPLICATIONS

This application is a U.S. national stage entry under 35 U.S.C. §371 of PCT International Application No. PCT/JP2009/067331, filed on Oct. 5, 2009, and claims priority to Japanese Application No. JP 2008-260593, filed on Oct. 7, 2008, and Japanese Application No. JP 2009-025586, filed on Feb. 6, 2009, the contents of which are incorporated herein by reference in their entirety.

TECHNICAL FIELD

This invention relates to a method of manufacturing a glass substrate for a magnetic disk for use in a magnetic disk device such as a hard disk drive (hereinafter referred to as a "HDD").

BACKGROUND ART

In recent years, a glass substrate has been used as one of magnetic disk substrates suitable for increasing the recording density. The glass substrate has a higher rigidity than a metal substrate and thus is suitable for an increase in rotational speed of a magnetic disk device. Further, since the glass substrate can obtain a smooth and flat surface, it can reduce the flying height of a magnetic head and thus is suitable for improving the S/N ratio and increasing the recording density.

In general, a glass substrate for a magnetic disk is manufactured by sequentially carrying out a process of heating and melting a glass material to prepare a molten glass, a process of forming this molten glass into a plate-shaped glass disk, and a process of processing and polishing the glass disk formed into the plate shape to thereby manufacture a glass substrate.

For forming the molten glass into the plate-shaped glass disk, a forming method such as a press method or a float method is employed. In the press method, a cylindrical glass base member is cut into a glass disk having a thickness slightly greater than that of a magnetic disk substrate and then the glass disk is adjusted in shape and processed to a required flatness and thickness. In a grinding process of processing the glass disk to the required flatness and thickness, the glass disk is ground to the target thickness and processed to the target flatness using a lapping machine. The processing is carried out by holding the glass disk between upper and lower surface plates of the lapping machine and rotating them in opposite directions while using free abrasive particles (slurry). As the free abrasive particles, use is made of abrasive particles with a particle size according to a predetermined dimensional accuracy and shape accuracy of the glass disk. In first grinding (lapping 1), the grinding is carried out using free abrasive particles with a large particle size (e.g. average particle size: about 30 μm), while, in second grinding (lapping 2: precision lapping process), the grinding is carried out using free abrasive particles with a small particle size (e.g. average particle size: about 10 μm).

In the float method, a glass disk is cut out from a plate-shaped glass manufactured by the float method and is adjusted in shape and its main surfaces are ground. The plate-shaped glass manufactured by the float method has mirror-finished main surfaces from the beginning and thus is excellent in flatness and thickness as compared with the pressed glass. Therefore, the lapping 1 using the free abrasive particles with the large particle size is omitted and the grinding (lapping 2) using the free abrasive particles with the small particle size is carried out from the beginning.

As a prior art relating to this, JP-A-2002-55061, for example, is cited.

PRIOR ART DOCUMENT

Patent Document

Patent Document 1: JP-A-2002-55061

SUMMARY OF THE INVENTION

Problem to be Solved by the Invention

In the meantime, if fixed abrasive particles with a particle size smaller than that of the free abrasive particles are used as grinding pads in the above-mentioned grinding of lapping 2, cracks that occur on a glass substrate can be made shallow and the surface roughness upon completion of the grinding of lapping 2 can be made small. For example, a diamond sheet in the form of a sheet bonded with diamond particles is used as the grinding pad. Since the particle size of the diamond particles used is smaller than that of alumina-based particles which are used as the free abrasive particles, cracks can be made shallow and the surface roughness can also be made small.

However, in order to polish a mirror-surface glass with a surface roughness Ra=0.01 μm or less, like the plate-shaped glass manufactured by the float method, to a required flatness without degrading the surface roughness as much as possible, fine abrasive particles are required. If the mirror-surface glass is processed using a grinding pad with such fine abrasive particles, there is a problem that the processing rate at the start of the processing should be suppressed to a very low rate (⅕ to 1/10 or less of normal processing rate) so that the processing time is prolonged.

The above-mentioned problem that the processing rate at the start of the polishing is low is a problem that is not limited to the mirror-surface plate glass manufactured by the float method, but occurs commonly when a mirror-surface plate glass is processed using a grinding pad with fine abrasive particles.

This invention has been made in view of such circumstances and has an object to provide a method of manufacturing a glass substrate for a magnetic disk, that can realize a high processing rate from the start of the processing to shorten the processing time when a main surface of a mirror-surface plate glass is processed using fine fixed abrasive particles.

Means for Solving the Problem

According to one aspect of this invention, a method of manufacturing a glass substrate for a magnetic disk comprises a surface grinding step of processing a mirror-surface plate glass, having a main surface in the form of a mirror surface, to a required flatness and surface roughness using fixed abrasive particles and further comprises, before the surface grinding step using the fixed abrasive particles, a surface roughening step of roughening the surface of the mirror-surface plate glass by frosting.

According to this method, since the surface of the mirror-surface plate glass is roughened by the simple method of the frosting, the plate glass can be ground at a high processing rate using the fixed abrasive particles so that the productivity can be improved.

In the method of manufacturing the glass substrate for the magnetic disk according to one aspect of this invention, it is preferable that a treatment liquid for use in the surface roughening step has a pH of 4.0 to 7.0 and contains hydrofluoric acid with a concentration of 4.0M to 8.0M and a buffer. According to this method, before processing the surface of the mirror-surface plate glass using the fixed abrasive particles, the treatment liquid having the pH of 4.0 to 7.0 and containing the hydrofluoric acid with the concentration of 4.0M to 8.0M and the buffer is used for roughening the surface of the mirror-surface plate glass to the level so that the fixed abrasive particles can serve to polish the surface of the mirror-surface plate glass. As a consequence, convex portions adapted to catch the fixed abrasive particles are formed on the surface of the mirror-surface plate glass so that it is possible to prevent sliding of the fixed abrasive particles on the surface of the mirror-surface plate glass and thus to realize a high processing rate from the start of the processing by the fixed abrasive particles.

In the method of manufacturing the glass substrate for the magnetic disk according to one aspect of this invention, it is preferable that the treatment liquid contains a fluoride ion supply agent as a corrosion reaction accelerator. Herein, the fluoride ion supply agent supplies fluoride ions to HF to provide $HF_2^-$, thereby improving the corrosion reaction rate of the treatment liquid.

In the method of manufacturing the glass substrate for the magnetic disk according to one aspect of this invention, it is preferable that the fluoride ion supply agent is selected from the group comprising $NH_4F$, $NaF$, $KF$, and $CaF_2$.

In the method of manufacturing the glass substrate for the magnetic disk according to one aspect of this invention, it is preferable that the buffer is selected from the group comprising $KOH$, $NaOH$, and $NH_4F$. In this case, when the buffer is $KOH$, it is preferable that the pH of the treatment liquid is 4.0 to 7.0. When the buffer is $NaOH$, it is preferable that the pH of the treatment liquid is 4.5 to 7.0.

In the method of manufacturing the glass substrate for the magnetic disk according to one aspect of this invention, it is preferable that the surface roughening step roughens the mirror-surface plate glass, having a mirror surface roughness Ra of 0.01 μm or less, to a surface roughness Ra of 2.0 μm to 10.0 μm.

In the method of manufacturing the glass substrate for the magnetic disk according to one aspect of this invention, it is preferable that, in the surface grinding step using the fixed abrasive particles, the surface of the mirror-surface plate glass is processed to a surface roughness Ra of 0.01 μm or less and a flatness of 6.0 μm or less.

The method of manufacturing the glass substrate for the magnetic disk according to one aspect of this invention preferably comprises a pre-cleaning step of pre-cleaning the surface of the mirror-surface plate glass before the surface roughening step.

In the method of manufacturing the glass substrate for the magnetic disk according to one aspect of this invention, it is preferable that the pre-cleaning is carried out under a condition so that variation in thickness of the mirror-surface plate glass after the frosting becomes 10 μm or less.

In the method of manufacturing the glass substrate for the magnetic disk according to one aspect of this invention, it is preferable that the pre-cleaning is carried out by chemical solution cleaning and/or scrub cleaning.

In the method of manufacturing the glass substrate for the magnetic disk according to one aspect of this invention, it is preferable that the chemical solution cleaning is carried out using at least two kinds selected from the group comprising acids, alkalis, and surfactants.

Effect of the Invention

According to one aspect of this invention, a method of manufacturing a glass substrate for a magnetic disk comprises a surface grinding step of processing a mirror-surface plate glass, having a main surface in the form of a mirror surface, to a required flatness and surface roughness using fixed abrasive particles and further comprises, before the surface grinding step using the fixed abrasive particles, a surface roughening step of roughening the surface of the mirror-surface plate glass in a simple way by frosting. As a consequence, the plate glass can be ground at a high processing rate using the fixed abrasive particles so that the productivity can be improved.

According to one aspect of this invention, a method of manufacturing a glass substrate for a magnetic disk comprises a surface grinding step of processing a mirror-surface plate glass, having a main surface in the form of a mirror surface, to a required flatness and surface roughness using fixed abrasive particles and further comprises, before the surface grinding step using the fixed abrasive particles, a surface roughening step of roughening the surface of the mirror-surface plate glass by a chemical method to the level so that the fixed abrasive particles can serve to polish the surface of the mirror-surface plate glass, wherein a treatment liquid for use in the surface roughening step has a pH of 4.0 to 7.0 and contains hydrofluoric acid with a concentration of 4.0M to 8.0M and a buffer. As a consequence, when the main surface of the mirror-surface plate glass is polished using fine fixed abrasive particles, it is possible to realize a high processing rate from the start of the polishing to shorten the processing time.

MODE FOR CARRYING OUT THE INVENTION

Figure 1:
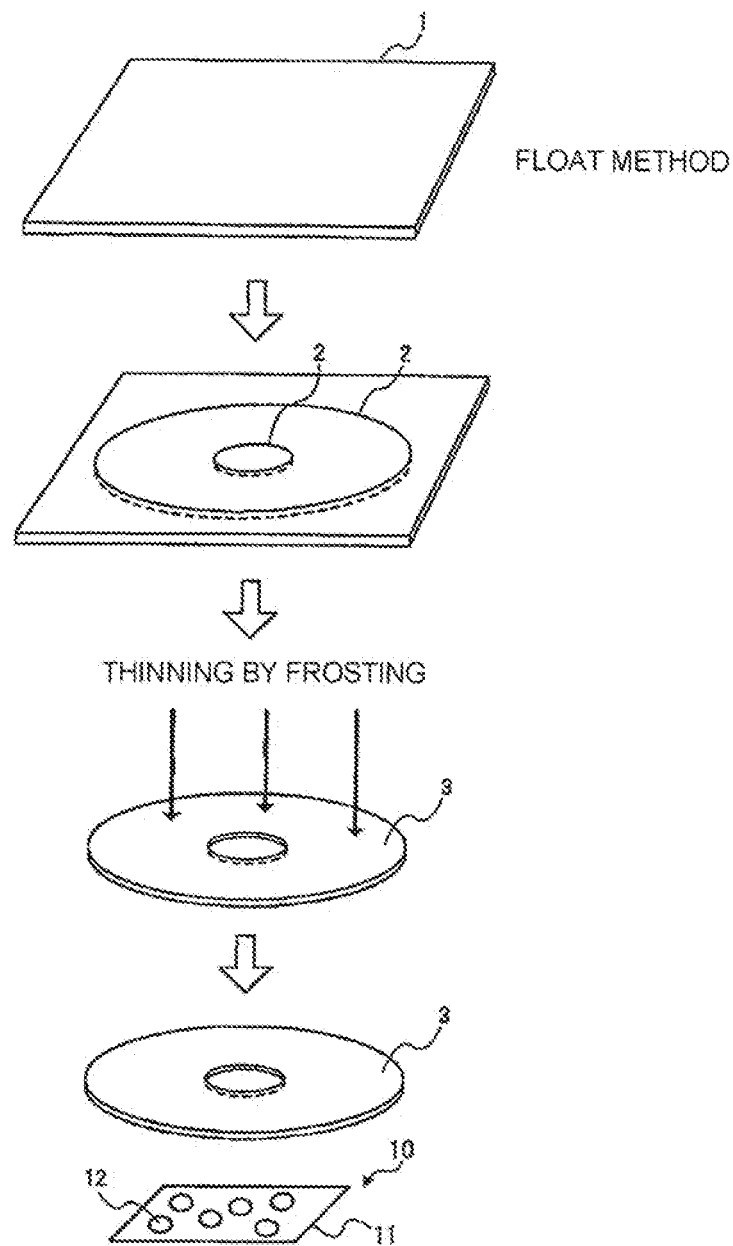
FIG. 1 is an exemplary diagram of processes which are a part of a method of manufacturing a glass substrate for a magnetic disk in an embodiment of this invention.

Hereinbelow, embodiments of this invention will be described in detail with reference to the accompanying drawings. In the following description, a description will be given of an example in which a plate-shaped glass member manufactured by the float method is used as a glass substrate member for a magnetic disk. However, this invention is applicable not only to the plate-shaped glass member manufactured by the float method, but also to a mirror-surface plate glass manufactured by another method. Further, this invention is similarly applicable even to a use other than as a glass substrate for a magnetic disk as long as the use is such that a surface of a mirror-surface plate glass is processed with fine fixed abrasive particles to a required flatness and surface roughness. Herein, a mirror surface represents a surface with a surface roughness (arithmetic mean roughness (Ra)) of 0.01

μm or less and, for example, the surface roughness can be obtained by measuring a 2 μm×2 μm square measurement area with a resolution of 256×256 pixels using an atomic force microscope.

Embodiment 1

In this embodiment, one example of a method of manufacturing a glass substrate for a magnetic disk will be described.

The method of manufacturing the magnetic disk glass substrate according to this embodiment is a method comprising a surface grinding process of processing a mirror-surface plate glass, having a main surface in the form of a mirror surface, to a required flatness and surface roughness using fixed abrasive particles, wherein, before the surface grinding process using the fixed abrasive particles, the surface (mirror surface) of the plate glass member is roughened by a chemical method so that the fixed abrasive particles effectively serve to polish the mirror surface of the plate glass member. As the chemical method for roughening the mirror surface of the plate glass member, frosting is particularly preferable.

Herein, the frosting represents the processing of treating a glass surface using a chemical solution for etching added with a surface roughening agent. In this frosting, etching proceeds in the state where the glass surface is locally masked with the surface roughening agent, and therefore, it is possible to effectively roughen the glass surface (e.g. the surface roughness Ra after the frosting is about 5 times to about several hundred times the surface roughness Ra before the frosting). As this surface roughening agent, there can be cited a general acid such as sulfuric acid, a general alkali such as sodium hydroxide or potassium hydroxide, a general fluoride such as hydrogen fluoride, ammonium fluoride, potassium fluoride, or sodium fluoride, or the like. By adjusting the concentration or the temperature of the chemical solution, the surface roughening state can be adjusted.

An aluminosilicate glass can be cited as a glass which is preferable as a material of the glass substrate. The aluminosilicate glass can realize an excellent smooth mirror surface and, for example, it can be increased in breaking strength by chemical strengthening.

As the aluminosilicate glass, it is preferable to use a glass for chemical strengthening which mainly contains $SiO_2$: 62 wt % to 75 wt %, $Al_2O_3$: 5 wt % to 15 wt %, $Li_2O$: 4 wt % to 10 wt %, $Na_2O$: 4 wt % to 12 wt %, and $ZrO_2$: 5.5 wt % to 15 wt %, wherein the weight ratio between $Na_2O$ and $ZrO_2$ is 0.5 to 2.0 and the weight ratio between $Al_2O_3$ and $ZrO_2$ is 0.4 to 2.5.

A material forming the magnetic disk glass substrate manufactured in this invention is not limited to that described above. That is, as the material of the glass substrate, there can be cited, for example, other than the above-mentioned aluminosilicate glass, a sodalime glass, a soda aluminosilicate glass, an aluminoborosilicate glass, a borosilicate glass, a quartz glass, a chain silicate glass, a glass ceramic such as a crystallized glass, or the like.

In grinding, glass substrates are set in a carrier, ground, and then removed from the carrier. When surface roughening is carried out with a thinning amount of 100 μm or less, the processing time relative to the time for this sequence of operations becomes very small. That is, since the thinning amount is small, the processing time becomes relatively short while the time for setting/removing the glass substrates becomes relatively long. Further, in the case of a 2.5-inch glass substrate, the number of glass substrates that can be set in the carrier is about 200 per carrier. Therefore, when the surface roughening is carried out with the thinning amount of 100 μm or less, the grinding is very inefficient. On the other hand, in the frosting, glass substrates are only immersed in a predetermined immersion bath and the glass substrates on the order of 1000 can be processed at a time, and therefore, the frosting is efficient. As a consequence, using the frosting when the surface roughening is carried out with the thinning amount of 100 μm or less, the productivity in the manufacture of glass substrates for magnetic disks becomes very high.

It is preferable that a pre-cleaning process of pre-cleaning the surface of the mirror-surface plate glass be carried out before the surface roughening process by the frosting. Since, in the frosting, the etching proceeds in the state where the glass surface is locally masked with the surface roughening agent, if particles or the like adhere to the mirror-finished glass surface before the frosting, the required shape of irregularities cannot be obtained and thus the flatness is lowered. Therefore, it is preferable that the mirror-finished glass surface before the frosting be cleaned.

Preferably, this pre-cleaning is carried out under conditions so that variation in thickness of the mirror-surface plate glass after the frosting becomes 10 μm or less. Herein, the flatness represents a difference between the highest portion and the lowest portion of the glass surface. The flatness can be measured by FT-900 (manufactured by Nidec Corporation), Opti Flat (manufactured by Phase Shift Technology, Inc.), or the like. In this case, the pre-cleaning is preferably carried out by chemical cleaning such as chemical solution cleaning and/or physical cleaning such as scrub cleaning, rock cleaning, ultrasonic cleaning, bubble cleaning, or the like. In this case, the chemical solution cleaning is preferably carried out using at least two kinds selected from the group comprising acids, alkalis, and surfactants.

As an acid for use in the pre-cleaning, there can be cited an inorganic acid such as sulfuric acid, phosphoric acid, nitric acid, or hydrochloric acid, or an organic acid such as acetic acid, citric acid, or amino acid. As an alkali for use in the pre-cleaning, there can be cited a general inorganic alkali such as potassium hydroxide, sodium hydroxide, or magnesium hydroxide, an organic alkali such as TMAH (tetramethylammonium hydroxide), or the like. Further, as a surfactant for use in the pre-cleaning, there can be cited a cationic surfactant, an anionic surfactant, an amphoteric surfactant, a nonionic surfactant, or the like. As a chemical agent for use in the pre-cleaning, use may be made of only one kind or a mixture of two or more kinds in the list given above.

It is preferable to use a post-cleaning process for the purpose of removing a substance deposited on the glass in the above-mentioned surface roughening process. Further, it is preferable to use an acid for carrying out the post-cleaning process. Using, as the acid for use in this event, a general acid such as an inorganic acid such as sulfuric acid, phosphoric acid, hydrochloric acid, or nitric acid, an organic acid such as acetic acid, amino acid, or citric acid, or a cationic surfactant, it is possible to remove the substance deposited on the glass in the surface roughening process. Among them, it is preferable to use the inorganic acid which can be easily obtained and is low-priced. On the other hand, in order to remove the substance deposited on the glass, it is preferable to use general physical cleaning such as ultrasonic cleaning, scrub cleaning, or bubble cleaning. In the post-cleaning, the substance deposited on the glass may be removed using only the acid, using the physical cleaning, or using both.

By forming at least a magnetic layer on the magnetic disk glass substrate obtained by this invention, a magnetic disk suitable for higher recording density is obtained. If a Co-based alloy magnetic layer with an hcp crystal structure is used as the magnetic layer, it is possible to achieve a higher coercive force (Hc) and thus to contribute to increasing the recording density. It is preferable to form an underlayer between the substrate and the magnetic layer for controlling crystal particles of the magnetic layer and the orientation thereof, if necessary.

Further, it is preferable to provide a protective layer on the magnetic layer. By providing the protective layer, it is possible to protect a surface of the magnetic disk from a magnetic recording head flying over the magnetic disk. A carbon-based protective layer, for example, is preferable as a material of the protective layer. It is preferable to further provide a lubricating layer on the protective layer. By providing the lubricating layer, it is possible to prevent the wear between the magnetic recording head and the magnetic disk and thus to improve the durability of the magnetic disk. PFPE (perfluoropolyether), for example, is preferable as a material of the lubricating layer.

According to this invention, from the plate-shaped glass obtained by the float method, it is possible to stably manufacture a glass substrate for use in a magnetic disk adapted to be mounted in a load/unload type magnetic disk device which is advantageous in increasing the recording density. Further, by manufacturing a magnetic disk using the magnetic disk glass substrate obtained by the manufacturing method of this invention, it is possible to achieve a reduction in manufacturing cost of the magnetic disk because the manufacturing yield of the magnetic disk glass substrate is high.

Embodiment 2

In this embodiment, a description will be given in detail of the frosting in the manufacturing method of the magnetic disk glass substrate.

Frosting is achieved by the occurrence of uniform corrosion reaction and anticorrosion reaction on a glass surface. Therefore, in order to provide the required irregularities on the glass surface by the frosting, it is necessary to produce uniform corrosion reaction and anticorrosion reaction. The present inventors paid attention to the concentration of hydrofluoric acid, the liquid property of a treatment liquid, and the kind of fluoride formed in a treatment, and applied frosting to glass surfaces while changing them in various ways to examine the irregularities of the glass surfaces.

The present inventors applied frosting to an aluminosilicate glass using a treatment liquid containing hydrofluoric acid and a buffer. In this event, the concentration of HF was changed from 4.0M to 8.0M, the liquid property of the treatment liquid was changed from pH 1.0 to pH 14.0, and KOH, NaOH, and $NH_4F$ were respectively used as buffers. In the frosting, the temperature was set to 50° C. and the time was set to 420 seconds. Then, glass surfaces after the frosting were respectively observed by SEM. As a result, it has been found that the height of convex portions formed on the glass surface differs depending on the concentration of HF (corrosion factor) and the liquid property (pH) and that the density of the irregularities differs depending on the kind of fluoride formed in the treatment. Specifically, as the concentration of HF increases, the height of the convex portions increases, while, as the concentration of HF decreases, the height of the convex portions decreases. Further, as the pH of the treatment liquid decreases (acidity is high/pH 4.0 to pH 7.0), the height of the convex portions increases, while, as the pH of the treatment liquid increases (alkalinity is high/greater than pH 7.0), the height of the convex portions decreases. Further, as the water solubility of a fluoride increases (e.g. KF), the density of the irregularities decreases.

If, based on this tendency, it is considered to realize the flatness and surface roughness (Ra) of the glass surface after the surface grinding process using the fixed abrasive particles, i.e. it is considered to roughen the mirror-surface plate glass, having a mirror surface roughness (Ra) of 0.01 μm or less, to a surface roughness Ra of 2.0 μm to 10.0 μm in the surface roughening process, the pH of a treatment liquid for use in the surface roughening process is preferably 4.0 to 7.0 and the concentration of hydrofluoric acid is preferably 4.0M to 8.0M. This treatment liquid contains a buffer in an amount sufficient for setting the pH in the above-mentioned range. Therefore, the amount of the buffer is appropriately set depending on the kind and concentration of the hydrogen fluoride ion supply agent and the target pH.

For example, the buffer is preferably selected from the group comprising KOH, NaOH, and $NH_4F$. In this case, when the buffer is KOH, the pH of the treatment liquid is preferably 4.0 to 7.0, while, when the buffer is NaOH, the pH of the treatment liquid is preferably 4.5 to 7.0.

As described above, the present inventors have found a treatment liquid that is optimal for obtaining convex portions, which are of a level capable of achieving a sufficient processing rate in the surface grinding process, in surface roughening of the surface of the mirror-surface plate glass. That is, the present inventors have found that using, in the surface roughening process, a treatment liquid of pH 4.0 to pH 7.0 containing hydrofluoric acid with a concentration of 4.0M to 8.0M, a buffer, and a fluoride ion supply agent as a corrosion reaction accelerator according to the need when the corrosion reaction rate of "hydrofluoric acid" is low, it is possible to realize a high processing rate from the start of the polishing to shorten the processing time when the main surface of the mirror-surface plate glass is polished using fine fixed abrasive particles.

The treatment liquid contains the fluoride ion supply agent as the corrosion reaction accelerator, if necessary. The fluoride ion supply agent supplies fluoride ions to HF to provide $HF_2^-$ in the liquid and, therefore, there can be cited, for example, $NH_4F$, NaF, KF, $CaF_2$, or the like. Accordingly, even if such a fluoride ion supply agent is used, as the concentration increases, the height of convex portions increases, while, as the concentration decreases, the height of convex portions decreases, further, as the pH of the treatment liquid decreases (acidity is high/pH 4.0 to pH 7.0), the height of convex portions increases, while, as the pH of the treatment liquid increases (alkalinity is high/greater than pH 7.0), the height of convex portions decreases, and further, as the water solubility of a fluoride increases (e.g. KF or $(NH_4)_2SiF_6$), the density of the irregularities decreases. Taking it into account, based on this tendency, to realize the flatness and surface roughness (Ra) of the glass surface after the surface grinding process using the fixed abrasive particles, i.e. to roughen the mirror-surface plate glass, having a mirror surface roughness (Ra) of 0.01 μm or less, to a surface roughness Ra of 2.0 μm to 10.0 μm in the surface roughening process, the pH of the treatment liquid for use in the surface roughening process and the concentration of the hydrogen fluoride ion supply agent are appropriately determined. This treatment liquid contains the buffer in an amount sufficient for setting the pH in the required range and the amount of the buffer is appropriately set according to the kind and concentration of the hydrogen fluoride ion supply agent and the target pH.

In the surface grinding process, it is preferable to carry out a first polishing process which, in order to remove cracks or strains remaining in the grinding using the fixed abrasive particles, polishes the surface of the glass substrate using a hard polisher as a polisher and a second polishing process which, in order to maintain the flat surface obtained in the first polishing process and to finish it to a smoother mirror surface, polishes the glass disk surface using a soft polisher instead of the hard polisher.

The glass substrate having been subjected to the polishing processes may be chemically strengthened. In the case where the kind of glass is particularly an aluminosilicate glass, the bending strength increases and the depth of a compressive stress layer also increases by chemical strengthening. A method of the chemical strengthening is not particularly limited as long as it is a conventionally known chemical strengthening method, but, from a practical point of view, it is preferably the chemical strengthening by a low-temperature ion-exchange method.

In the above-mentioned manufacturing method of the magnetic disk glass substrate, before processing the surface of the mirror-surface plate glass using the fixed abrasive particles (before the main surface grinding process), the surface of the mirror-surface plate glass is roughened by the chemical method to the level so that the fixed abrasive particles can serve to polish the surface of the mirror-surface plate glass, and the treatment liquid for use in the surface roughening process has the pH of 4.0 to 7.0 and contains the hydrofluoric acid with the concentration of 4.0M to 8.0M and the buffer. As a consequence, convex portions adapted to catch the fixed abrasive particles are formed on the surface of the mirror-surface plate glass so that the fixed abrasive particles are prevented from sliding on the surface of the mirror-surface plate glass. As a result, it is possible to realize a high processing rate from the start of the processing by the fixed abrasive particles to shorten the processing time in the surface grinding process.

In the main surface grinding process, the surface of the mirror-surface plate glass is processed using the fixed abrasive particles. In this case, it is preferable to process the surface of the mirror-surface plate glass to a surface roughness Ra of 0.01 μm or less and a flatness of 6.0 μm or less.

Hereinbelow, the embodiments of this invention will be described in detail with reference to Examples. This invention is not limited to the following Examples.

Example 1

A glass substrate for a magnetic disk of this Example was manufactured through (1) Cutting-Out Process, (2) Surface Roughening Process, (3) Shaping Process, (4) Precision Lapping Process, (5) End Face Polishing Process, (6) Main Surface Polishing Process, and (7) Chemical Strengthening Process which will be described hereinbelow. (2) Surface Roughening Process (Frosting) is required to be carried out before (4) Precision Lapping Process and, in this Example, it was carried out between (1) Cutting-Out Process and (3) Shaping Process. FIG. 1 shows conceptual diagrams of the processes (1) to (4).

A plate-shaped glass member for manufacturing a glass substrate for a magnetic disk was manufactured by the float method. In the float method, a molten liquid was caused to flow on molten tin and to solidify as it was. Both surfaces of a plate glass were a glass free surface and a glass/tin interface so that a plate-shaped glass member having mirror surfaces with a surface roughness Ra of 0.001 μm or less was obtained without polishing the surfaces.

(1) Cutting-Out Process

Use was made of a plate-shaped glass member 1 in the form of an aluminosilicate glass with a thickness of 0.95 mm manufactured by the float method and cut into a square shape with a predetermined size. Then, circular cut lines 2 describing approximate edges on the outer and inner peripheral sides of a region to be a glass substrate for a magnetic disk were formed on a top surface of the plate-shaped glass member 1 by a glass cutter. As the aluminosilicate glass, use was made of a glass for chemical strengthening containing $SiO_2$: 58 mass % to 75 mass %, $Al_2O_3$: 5 mass % to 23 mass %, $Li_2O$: 3 mass % to 10 mass %, and $Na_2O$: 4 mass % to 13 mass %. Then, the top surface side of the plate-shaped glass formed with the cut lines 2 was heated in its entirety by a heater to advance the cut lines 2 to the bottom surface side of the plate-shaped glass, thereby cutting out a glass disk 3 (mirror-surface plate glass) having a predetermined diameter.

(2) Surface Roughening Process

By frosting, surface roughening was carried out with a thinning amount (machining allowance) of 100 μm. The conditions of the frosting were such that use was made of a mixed liquid of 4M hydrogen fluoride, 4M ammonium fluoride, 1.5M propylene glycol, 0.04M polyoxyethylene glyceryl isostearate, 0.001M sucrose, and 35.6M water at a temperature of 25° C. for a time of 7 minutes. In this event, the processing was carried out so that the surface roughness Ra of the mirror-surface glass after the frosting became about 0.01 μm to 2.0 μm. It is preferable that the target surface roughness in the surface roughening process be determined based on the relationship with the particle size of fixed abrasive particles for use in a later precision lapping process.

(3) Shaping Process

Then, grinding was applied to an outer peripheral end face and an inner peripheral end face to obtain an outer diameter of 65 mmφ and an inner diameter (diameter of a circular hole at a central portion) of 20 mmφ, then predetermined chamfering was applied to the outer peripheral end face and the inner peripheral end face. In this event, the surface roughness of the end faces of the glass disk was about 2 μm in Rmax. In general, a magnetic disk with an outer diameter of 65 mm is used in a 2.5 (inch) HDD (hard disk drive).

(4) Precision Lapping Process

Figure 2:
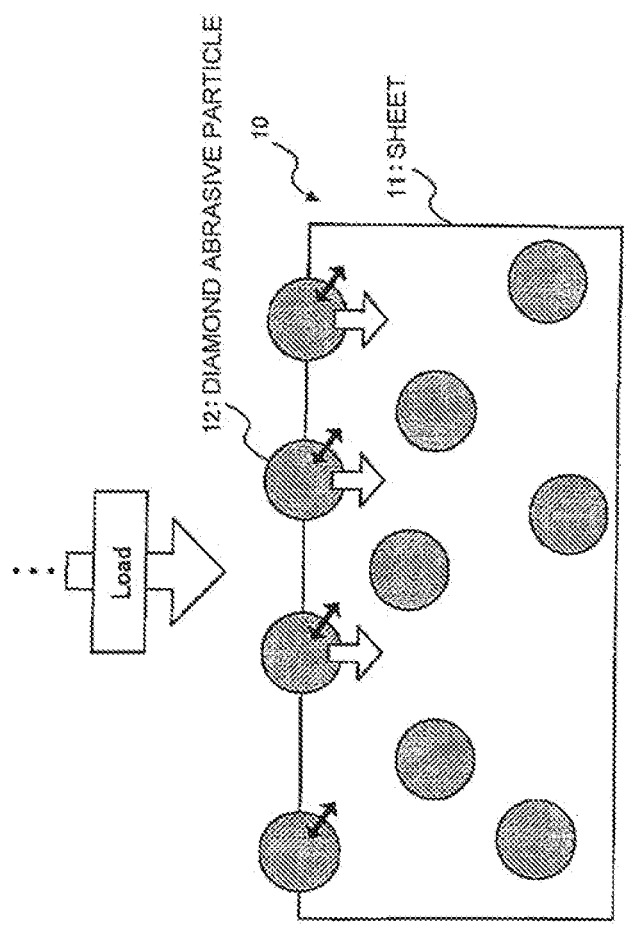
FIG. 2 is an exemplary diagram of a diamond sheet.

A roughened main surface of the glass disk 3 was ground using a fixed abrasive particle polishing pad. A diamond sheet 10 shown in FIG. 2 was used as the fixed abrasive particle polishing pad. The diamond sheet 10 has diamond particles as grinding abrasive particles. The diamond sheet 10 has a sheet 11 made of PET as a base member. The average particle size of the diamond particles 12 was B=4 μm.

In the precision lapping process, by setting the surface-roughened glass disk 3 in an lapping machine and lapping the disk surface using the diamond sheet 10, it was possible to set the surface roughness Ra to 0.1 μm or less at a high processing rate. The processing rate is defined as "polishing amount (machining allowance)/time".

As described above, since the main surface of the glass disk 3 is roughened in advance in the surface roughening process, portions adapted to catch the fine fixed abrasive particles are formed on the main surface of the glass disk 3 so that it is possible to prevent unwanted sliding of the fixed abrasive particles on the surface of the member. As a consequence, the processing rate in the precision lapping process can be a high processing rate from the start of the surface polishing.

(5) End Face Polishing Process

Then, by brush polishing, the end faces (inner peripheral and outer peripheral) of the glass disk 3 were polished to a surface roughness of 0.4 μm in Rmax and about 0.1 μm in Ra while rotating the glass disk 3. Then, the surfaces of the glass disk 3 having been subjected to the above-mentioned end face polishing were washed with water.

(6) Main Surface Polishing Process

Then, a first polishing process for removing cracks or strains remaining in the above-mentioned lapping process was carried out using a double-side polishing machine. In the double-side polishing machine, the glass disk 3 held by a carrier is placed in tight contact between upper and lower polishing surface plates each bonded with a polishing pad, the carrier is brought into mesh with a sun gear and an internal gear, and the glass disk is pressed between the upper and lower polishing surface plates. Then, by rotating the upper and lower polishing surface plates while supplying a polishing liquid between the polishing pads and the polishing surfaces of the glass disk, the glass disk makes an orbital motion while rotating on its axis on the polishing surface plates so that both surfaces of the glass disk are polished simultaneously. Specifically, using a hard polisher (hard urethane foam) as the polisher, the first polishing process was carried out.

Then, a second polishing process was carried out using the same double-side polishing machine used in the first polishing process while changing the polisher to a soft-polisher (suede) polishing pad. This second polishing process is a mirror-polishing process for finishing the main surface of the glass disk to a smooth mirror surface with a surface roughness of, for example, about 3 nm or less in Rmax while maintaining the flat surface obtained in the first polishing process.

(7) Chemical Strengthening Process

Then, chemical strengthening was applied to the glass disk having been subjected to cleaning. Ions present in the surface of the glass substrate (e.g. $Li^+$ and $Na^+$ in the case of using the aluminosilicate glass) are replaced by ions ($Na^+$ and $K^+$) having greater ionic radii. The rigidity of the glass substrate is increased by performing ion exchange with atoms having greater ionic radii in the surface of the glass substrate (e.g. about 5 μm from the surface of the glass substrate) to thereby apply a compressive stress to the glass surface. In the manner described above, a magnetic disk glass substrate of this Example was obtained.

Then, using a sputtering apparatus, a seed layer, an underlayer, a magnetic layer, a protective layer, and a lubricating layer were formed in this order on the magnetic disk glass substrate obtained in this Example, thereby obtaining a magnetic disk. As the seed layer, a first seed layer in the form of a CrTi thin film and a second seed layer in the form of an AlRu thin film were formed. A CrW thin film was used as the underlayer, which was provided for improving the crystal structure of the magnetic layer. A thin film made of a CoPt-CrB alloy was used as the magnetic layer. The contents of Co, Pt, Cr, and B of the magnetic layer were Co: 73 at %, Pt: 7 at %, Cr: 18 at %, and B: 2 at %, respectively. The protective layer is for preventing degradation of the magnetic layer due to contact with a magnetic head and was made of hydrogenated carbon to obtain wear resistance. The lubricating layer was formed by a dipping method using a perfluoropolyether liquid lubricant.

Comparative Example 1

Figure 3:
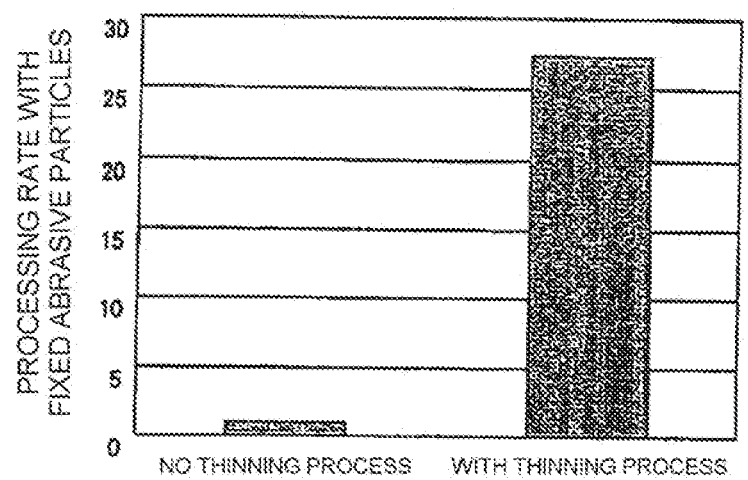
FIG. 3 is a diagram showing the relationship between the presence of a surface roughening process and the processing rate in a precision lapping process.

The processing rate of a mirror-finished glass in (4) Precision Lapping was examined in the same manner as in Example 1 except that the surface roughening process was not carried out. As a result, as shown in FIG. 3, the processing rate was very low. Assuming that the processing rate in precision lapping of the mirror-finished glass in Comparative Example 1 is 1, the processing rate in precision lapping of the mirror-finished glass having been subjected to the surface roughening by the frosting was 22.4. This is considered to be because since the main surface of the glass disk 3 was roughened by the frosting in advance, convex portions adapted to catch fine fixed abrasive particles were formed on the main surface of the glass disk 3 so that it was possible to prevent unwanted sliding of the fixed abrasive particles on the surface of the member.

Example 2

In this Example, a description will be given of the processing rate in the precision lapping process in the case where the treatment liquid is changed in the surface roughening process of the above-mentioned Example 1. In this Example, a glass substrate for a magnetic disk was manufactured through (1) Cutting-Out Process, (2) Shaping Process, (3) Surface Roughening Process, (4) Precision Lapping Process, (5) End Face Polishing Process, (6) Main Surface Polishing Process, and (7) Chemical Strengthening Process described above. In this Example, the surface roughening process was carried out after the shaping process.

Example 2-1

In the surface roughening process, a treatment liquid was prepared by using 4.0M HF and adding thereto KOH as a buffer. The pH of this treatment liquid was 4.55. A glass disk was immersed in this treatment liquid so that frosting was applied to a glass surface. In the frosting, the treatment temperature was set to 50° C. and the treatment time was set to 420 seconds. In this frosting, $HF_2^-$ serves as a corrosion factor while KF serves as an anticorrosion factor. By this frosting, the entire surface of the mirror-surface glass disk 3 had an approximately uniform surface roughness Ra of about 0.01 μm to 0.4 μm. It is preferable that the target surface roughness in the surface roughening process be determined based on the relationship with the particle size of fixed abrasive particles for use in the later precision lapping process. The processing rate in the precision lapping process of the glass disk having been subjected to this frosting was 6.0 μm/min.

Example 2-2

A glass substrate for a magnetic disk was manufactured in the same manner as in Example 1 except that a treatment liquid was prepared by using 6.0M HF and adding thereto KOH as a buffer in the surface roughening process. The pH of this treatment liquid for frosting was 4.5. The processing rate in the precision lapping process of the glass disk having been subjected to this frosting was 6.0 μm/min.

Example 2-3

A glass substrate for a magnetic disk was manufactured in the same manner as in Example 1 except that a treatment liquid was prepared by using 8.0M HF and adding thereto KOH as a buffer in the surface roughening process. The pH of this treatment liquid for frosting was 4.5. The processing rate in the precision lapping process of the glass disk having been subjected to this frosting was 8.0 μm/min.

Example 2-4

A glass substrate for a magnetic disk was manufactured in the same manner as in Example 1 except that a treatment liquid was prepared by using 4.0M HF and adding thereto NaOH as a buffer in the surface roughening process. The pH of this treatment liquid for frosting was 4.5. In this frosting, $HF_2^-$ serves as a corrosion factor while NaF serves as an anticorrosion factor. The processing rate in the precision lapping process of the glass disk having been subjected to this frosting was 4.5 μm/min.

Example 2-5

A glass substrate for a magnetic disk was manufactured in the same manner as in Example 1 except that a treatment liquid was prepared by using 6.0M HF and adding thereto NaOH as a buffer in the surface roughening process. The pH of this treatment liquid for frosting was 4.5. The processing rate in the precision lapping process of the glass disk having been subjected to this frosting was 6.5 μm/min.

Example 2-6

A glass substrate for a magnetic disk was manufactured in the same manner as in Example 1 except that a treatment liquid was prepared by using 8.0M HF and adding thereto NaOH as a buffer in the surface roughening process. The pH of this treatment liquid for frosting was 4.5. The processing rate in the precision lapping process of the glass disk having been subjected to this frosting was 8.5 μm/min.

Comparative Example 2-1

A glass substrate for a magnetic disk was manufactured in the same manner as in Example 1 except that a treatment liquid was prepared by using 1.0M HF and adding thereto NaOH as a buffer in the surface roughening process. The pH of this treatment liquid for frosting was 4.5. The processing rate in the precision lapping process of the glass disk having been subjected to this frosting was 1.8 μm/min.

Comparative Example 2-2

A glass substrate for a magnetic disk was manufactured in the same manner as in Example 1 except that a treatment liquid was prepared by using 10.0M HF and adding thereto NaOH as a buffer in the surface roughening process. The pH of this treatment liquid for frosting was 4.5. The processing rate in the precision lapping process of the glass disk having been subjected to this frosting was 2.0 μm/min. In this case, there arose a problem of reduction in processing rate in the precision lapping process. This is considered to be because since the concentration of HF was high, convex portions obtained by the frosting were excessively corroded so that the height of the convex portions was not sufficient for precision lapping.

Comparative Example 2-3

A glass substrate for a magnetic disk was manufactured in the same manner as in Example 1 except that a treatment liquid was prepared by using 0.5M HF and adding thereto NaOH as a buffer in the surface roughening process. The pH of this treatment liquid for frosting was 4.5. The processing rate in the precision lapping process of the glass disk having been subjected to this frosting was 1.4 μm/min. This is considered to be because the height of convex portions obtained by the frosting was not sufficient for precision lapping.

Comparative Example 2-4

A glass substrate for a magnetic disk was manufactured in the same manner as in Example 1 except that a treatment liquid was prepared by using 12.0M HF and adding thereto NaOH as a buffer in the surface roughening process. The pH of this treatment liquid for frosting was 4.5. The processing rate in the precision lapping process of the glass disk having been subjected to this frosting was 1.5 μm/min. In this case, there arose a problem of reduction in processing rate in the precision lapping process. This is considered to be because since the concentration of HF was high, convex portions obtained by the frosting were excessively corroded so that the height of the convex portions was not sufficient for precision lapping.

Comparative Example 2-5

A glass substrate for a magnetic disk was manufactured in the same manner as in Example 1 except that the pH of a treatment liquid obtained by using 6.0M HF and adding thereto NaOH as a buffer was set to 2.0 in the surface roughening process. The processing rate in the precision lapping process of the glass disk having been subjected to this frosting was too low to be measured. This is considered to be because the height of convex portions obtained by the frosting was not sufficient for precision lapping.

Comparative Example 2-6

A glass substrate for a magnetic disk was manufactured in the same manner as in Example 1 except that the pH of a treatment liquid obtained by using 8.0M HF and adding thereto NaOH as a buffer was set to 10.0 in the surface roughening process. The processing rate in the precision lapping process of the glass disk having been subjected to this frosting was too low to be measured. This is considered to be because the height of convex portions obtained by the frosting was not sufficient for precision lapping.

Comparative Example 2-7

A glass substrate for a magnetic disk was manufactured in the same manner as in Example 1 except that the pH of a treatment liquid obtained by using 6.0M HF and adding thereto NaOH as a buffer was set to 12.0 in the surface roughening process. The processing rate in the precision lapping process of the glass disk having been subjected to this frosting was too low to be measured. This is considered to be because the height of convex portions obtained by the frosting was not sufficient for precision lapping.

As described above, using a treatment liquid that is optimal for obtaining convex portions, which are of a level capable of achieving a sufficient processing rate in the surface grinding process, (i.e. a treatment liquid of pH 4.0 to pH 7.0 containing hydrofluoric acid with a concentration of 4.0M to 8.0M and a buffer), in surface roughening of the surface of the mirror-surface plate glass, it is possible to form convex portions, which are adapted to catch the fixed abrasive particles, on the surface of the mirror-surface plate glass so that it is possible to prevent sliding of the fixed abrasive particles on the surface of the mirror-surface plate glass and thus to realize a high processing rate from the start of the processing by the fixed abrasive particles.

Example 3

Figure 4:
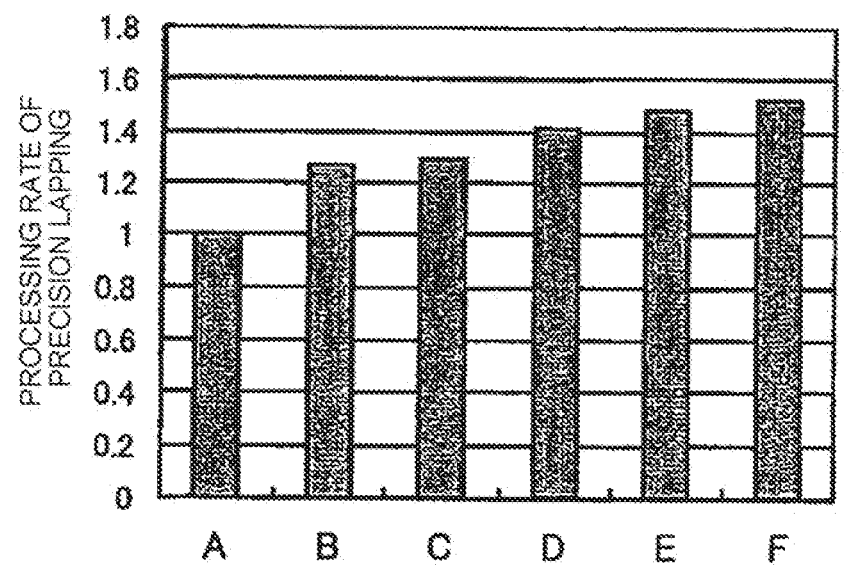
FIG. 4 is a diagram showing the relationship between the condition of cleaning before frosting and the processing rate in a precision lapping process.

In this Example, the influence of pre-cleaning upon the processing rate was examined when the pre-cleaning was carried out before frosting. The conditions in this event were A: no pre-cleaning, B: cleaning with 1.0M sulfuric acid, C:

cleaning with 1.0M potassium hydroxide, D: cleaning with a mixed solution of surfactant+potassium hydroxide+chelating agent, E: scrub cleaning, and F: cleaning of D+E. After carrying out the pre-cleaning under these conditions, the frosting was carried out. The conditions of the frosting were such that use was made of a mixed liquid of 4M hydrogen fluoride, 4M ammonium fluoride, 1.5M propylene glycol, 0.04M polyoxyethylene glyceryl isostearate, 0.001M sucrose, and 35.6M water at a temperature of 25° C. for a time of 7 minutes. Then, surface-roughened glass substrates were processed in the precision lapping process. FIG. 4 shows the processing rates in this event.

As seen from FIG. 4, assuming that the processing rate in precision lapping of the surface-roughened substrate after carrying out the pre-cleaning under the condition A is 1, the processing rates in precision lapping of the surface-roughened substrates after carrying out the pre-cleaning under the respective conditions are shown as, in terms of the pre-cleaning conditions, B: 1.27, C: 1.29, D: 1.41, E: 1.49, and F: 1.53 and, thus, the precision lapping processing rates were further improved by carrying out the pre-cleaning. This is considered to be because the surface of the mirror-finished glass was cleaned before the frosting and thus the frosting was uniformly carried out in the plane so that the flatness of the glass surface after the frosting was excellent.

This invention is not limited to the above-mentioned embodiments and can be carried out with appropriate changes thereto. The numbers and sizes of the components, the processing sequences, and so on in the above-mentioned embodiments are only examples and this invention can be carried out by changing them in various ways within a range capable of exhibiting the effect of this invention. Other than that, this invention can be carried out with appropriate changes within a range not departing from the object of this invention.

The invention claimed is:

1. A method of manufacturing a glass substrate for a magnetic disk, comprising the steps of:
    roughening a surface of a plate glass by frosting the surface before any polishing or grinding;
    thereafter surface grinding the roughened plate glass to a required flatness and surface roughness using fixed abrasive particles; and
    thereafter polishing the surface of the ground plate glass;
    wherein the surface roughening step roughens the surface of the plate glass to such a level that the fixed abrasive particles can more quickly process the surface by grinding.

2. The method of manufacturing the glass substrate for the magnetic disk according to claim 1, wherein a treatment liquid for use in the surface roughening step has a pH of 4.0 to 7.0 and contains hydrofluoric acid with a concentration of 4.0M to 8.0M and a buffer.

3. The method of manufacturing the glass substrate for the magnetic disk according to claim 2, wherein the treatment liquid contains a fluoride ion supply agent as a corrosion reaction accelerator.

4. The method of manufacturing the glass substrate for the magnetic disk according to claim 3, wherein the fluoride ion supply agent is selected from the group comprising $NH_4F$, $NaF$, $KF$, and $CaF_2$.

5. The method of manufacturing the glass substrate for the magnetic disk according to claim 2, wherein the buffer is selected from the group comprising KOH, NaOH, and $NH_4F$.

6. The method of manufacturing the glass substrate for the magnetic disk according to claim 5, wherein when the buffer is KOH, the pH of the treatment liquid is 4.0 to 7.0.

7. The method of manufacturing the glass substrate for the magnetic disk according to claim 5, wherein when the buffer is NaOH, the pH of the treatment liquid is 4.5 to 7.0.

8. The method of manufacturing the glass substrate for the magnetic disk according to claim 1, wherein the surface roughening step roughens the plate glass, having a surface roughness Ra of 0.01 µm or less, to a surface roughness Ra of 2.0 µm to 10.0 µm.

9. The method of manufacturing the glass substrate for the magnetic disk according to claim 1, wherein, in the surface grinding step using the fixed abrasive particles, the surface of the plate glass is processed to a surface roughness Ra of 0.01 µm or less and a flatness of 6.0 µm or less.

10. The method of manufacturing the glass substrate for the magnetic disk according to claim 1, comprising:
    a pre-cleaning step of pre-cleaning the surface of the plate glass before the surface roughening step.

11. The method of manufacturing the glass substrate for the magnetic disk according to claim 10, wherein the pre-cleaning is carried out under a condition so that variation in thickness of the plate glass after the frosting becomes 10 µm or less.

12. The method of manufacturing the glass substrate for the magnetic disk according to claim 10, wherein the pre-cleaning is carried out by chemical solution cleaning and/or scrub cleaning.

13. The method of manufacturing the glass substrate for the magnetic disk according to claim 12, wherein the chemical solution cleaning is carried out using at least two selected from the group consisting of acids, alkalis, and surfactants.

14. The method of manufacturing the glass substrate for the magnetic disk according to claim 1, wherein the plate glass is set in a carrier during the surface grinding step.

15. The method of manufacturing the glass substrate for the magnetic disk according to claim 1, wherein in the polishing step, the surface of the plate glass is finished to a surface of 3 nm or less in Rmax.

16. The method of manufacturing the glass substrate for the magnetic disk according to claim 1, wherein a processing rate in the surface roughening step is 4.5 µm/min or more.

17. A method of manufacturing a glass substrate for a magnetic disk, comprising the steps of:
    roughening a surface of a plate glass before any polishing or grinding;
    thereafter surface grinding the roughened plate glass to a required flatness and surface roughness using fixed abrasive particles; and
    thereafter polishing the surface of the ground plate glass.

18. A method of manufacturing a glass substrate for a magnetic disk, comprising the steps of:
    roughening a surface of a plate glass before any polishing or grinding;
    thereafter surface grinding the roughened surface to a required flatness and surface roughness using fixed abrasive particles; and
    thereafter polishing the surface.

19. The method of manufacturing the glass substrate for the magnetic disk according to claim 17, wherein the surface roughening step roughens the plate glass to a surface roughness Ra of 2.0 µm to 10.0 µm.

20. The method of manufacturing the glass substrate for the magnetic disk according to claim 17, wherein the plate glass has a surface roughness Ra of 0.01 µm or less.

21. The method of manufacturing the glass substrate for the magnetic disk according to claim 17, wherein the fixed abrasive particles are diamond particles.

22. The method of manufacturing the glass substrate for the magnetic disk according to claim 17, wherein, in the surface grinding step using the fixed abrasive particles, the surface of the plate glass is processed to a surface roughness Ra of 0.01 μm or less and a flatness of 6.0 μm or less.

23. The method of manufacturing the magnetic disk, comprising:
forming at least a magnetic layer on the glass substrate manufactured by the method according to claim 17.

24. The method of manufacturing the glass substrate for the magnetic disk according to claim 18, wherein the surface roughening step roughens the plate glass to a surface roughness Ra of 2.0 μm to 10.0 μm.

25. The method of manufacturing the glass substrate for the magnetic disk according to claim 18, wherein the plate glass has a roughness Ra of 0.01 μm or less.

26. The method of manufacturing the glass substrate for the magnetic disk according to claim 18, wherein the fixed abrasive particles are diamond particles.

27. The method of manufacturing the glass substrate for the magnetic disk according to claim 18, wherein, in the surface grinding step using the fixed abrasive particles, the surface of the plate glass is processed to a surface roughness Ra of 0.01 μm or less and a flatness of 6.0 μm or less.

28. The method of manufacturing the magnetic disk, comprising:
forming at least a magnetic layer on the glass substrate manufactured by the method according to claim 18.

29. The method of manufacturing the glass substrate for the magnetic disk according to claim 1, wherein the plate glass is a mirror-surface plate glass having a mirror surface.

30. The method of manufacturing the glass substrate for the magnetic disk according to claim 17, wherein the plate glass is a mirror-surface plate glass having a mirror surface.

31. The method of manufacturing the glass substrate for the magnetic disk according to claim 18, wherein the plate glass is a mirror-surface plate glass having a mirror surface.

32. The method of manufacturing the glass substrate for the magnetic disk according to claim 18, wherein the plate glass is manufactured by a float method.

33. The method of manufacturing the glass substrate for the magnetic disk according to claim 17, wherein the surface roughening step roughens the surface of the plate glass to such a level that the fixed abrasive particles serve to process the surface by grinding.

34. The method of manufacturing the glass substrate for the magnetic disk according to claim 18, wherein the surface roughening step roughens the surface of the plate glass to such a level that the fixed abrasive particles serve to process the surface by grinding.

* * * * *